United States Patent
Baldassarre et al.

(10) Patent No.: US 10,999,392 B2
(45) Date of Patent: May 4, 2021

(54) MESSAGE RECOVERY SYSTEM FOR COMPUTING NODES WITH REPLICATED DATABASES

(71) Applicant: Accenture Global Solutions Limited, Dublin (IE)

(72) Inventors: Emanuele Baldassarre, Bari (IT); Giorgio Andreoli, Rome (IT); Luigi Lucca, Rome (IT); Pasquale Di Tucci, Latina (IT); Fabio Mungo, Rome (IT)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/290,603

(22) Filed: Mar. 1, 2019

(65) Prior Publication Data

US 2020/0280613 A1 Sep. 3, 2020

(51) Int. Cl.
*G06F 15/16* (2006.01)
*H04L 29/08* (2006.01)
*G06F 16/27* (2019.01)

(52) U.S. Cl.
CPC ........ *H04L 67/2809* (2013.01); *G06F 16/275* (2019.01); *H04L 67/1036* (2013.01); *H04L 67/1095* (2013.01)

(58) Field of Classification Search
CPC ..... G06F 16/1774; G06F 3/067; G06F 16/182
See application file for complete search history.

(56) References Cited

U.S. PATENT DOCUMENTS 5,940,826 A * 8/1999 Heideman ............... G06F 9/526
7,356,531 B1 * 4/2008 Popelka .............. G06F 11/2028
707/682

(Continued)

FOREIGN PATENT DOCUMENTS

| EP | 2645675 A1 | 10/2013 |
| EP | 3702936 | 9/2020 |
| WO | 2018/113543 A1 | 6/2018 |

OTHER PUBLICATIONS

Persistence. Apache ActiveMQ Artemis User Manual. https://activemq.apache.org/artemis/docs/latest/persistence.html.

(Continued)

*Primary Examiner* — Umar Cheema
*Assistant Examiner* — Tesfu N Mekonen
(74) *Attorney, Agent, or Firm* — Plumsea Law Group, LLC

(57) ABSTRACT

A system and method for recovering messages in a multi-node system that incorporates an active-active architecture with replicated databases is disclosed. The system comprises two or more computing nodes where each computing node includes brokers for processing local messages and a recovery broker for recovering messages from the replicated database when another node in the system fails. Each recovery broker competes with brokers on another node to acquire locks on database information. The recovery broker is successful if the network of brokers on the other node are unavailable and fail to obtain or retain locks on the database information. In this situation, the recovery broker can retrieve messages from the database information and pass the messages to other brokers on the same computing node for processing and completing any ongoing transactions.

20 Claims, 6 Drawing Sheets

(56) References Cited

U.S. PATENT DOCUMENTS

| | | | | |
|---|---|---|---|---|
| 7,565,498 | B1* | 7/2009 | Baird | G06F 3/061 |
| | | | | 710/39 |
| 8,538,029 | B2* | 9/2013 | Li | H04L 9/085 |
| | | | | 380/279 |
| 9,984,140 | B1 | 5/2018 | Sukumaran et al. | |
| 2005/0080796 | A1 | 4/2005 | Midgley | |
| 2006/0101081 | A1* | 5/2006 | Lin | G06F 16/2343 |
| 2007/0185872 | A1* | 8/2007 | Ho | G06F 9/526 |
| 2010/0023521 | A1* | 1/2010 | Arcese | G06F 16/2343 |
| | | | | 707/E17.007 |
| 2014/0047263 | A1* | 2/2014 | Coatney | G06F 11/2023 |
| | | | | 714/4.11 |
| 2014/0156619 | A1* | 6/2014 | Lee | G06F 16/21 |
| | | | | 707/703 |
| 2014/0258224 | A1* | 9/2014 | Song | G06F 16/21 |
| | | | | 707/610 |
| 2016/0156502 | A1 | 6/2016 | Fugitt et al. | |
| 2017/0192863 | A1* | 7/2017 | Eluri | G06F 11/2033 |
| 2018/0359201 | A1* | 12/2018 | Rangasamy | G06F 11/0766 |
| 2020/0026625 | A1* | 1/2020 | Konka | G06F 11/0709 |

OTHER PUBLICATIONS

Highly Available (Mirrored) Queues. RabbitMQ Server Documentation. https://www.rabbitmq.com/ha.html.

Persistence Configuration. RabbitMQ Server Documentation. https://www.rabbitmq.com/persistence-conf.html.

RDQM disaster recovery. IBM MQ Documentation. https://www.ibm.com/support/knowledgecenter/en/SSFKSJ_9.0.0/com.ibm.mq.con.doc./q131670_.html.

Extended European Search Report dated May 25, 2020 for European Patent Application No. 20160025.1.

Response to EP Communication pursuant to Rules 70(2) and 70a(2) EPC as submitted to European Patent Office dated Nov. 9, 2020.

* cited by examiner

MESSAGE RECOVERY SYSTEM FOR COMPUTING NODES WITH REPLICATED DATABASES

TECHNICAL FIELD

The present disclosure relates to multi-node computing architectures, and in particular to multi-node architectures that use replicated databases.

BACKGROUND

An active-active system is a computing architecture comprised of multiple independent processing nodes that have access to a common replicated database so that the different nodes may participate in a common application. In applications using messaging services (such as Java Messaging Services) failure at one node in the system may require messages to be recovered and processed at another node. Existing solutions for recovering messages require messaging brokers to be on the same network, or for the system to have network visibility at the broker level.

However, network policies applied in a production environment may restrict network visibility at different levels. For example, network policies used with banking and other financial applications may restrict network visibility at the application level, due to security concerns. This limitation makes existing JMS disaster recovery solutions unusable in such contexts. Moreover, in applications that deal with financial transactions, losing messages or having transactions fail (or expire) can be extremely costly.

There is a need in the art for a system and method that addresses the shortcomings of the prior art discussed above.

SUMMARY

A system and method for managing messages in a multi-node system that incorporates replicated databases is disclosed. The system and method use recovery brokers on one site to access messages on a cross-site using database locks on a common replicated database. In particular, the system ensures that a recovery broker can obtain a lock on a database when brokers on the cross-site fail to maintain a lock, for example when the cross-site fails. By allowing the recovery broker to obtain a lock on the database, the recovery broker can capture any orphaned messages on the database and transfer them to brokers on the same site for further processing. Moreover, anytime brokers are active on the cross-site, the recovery broker is prevented from obtaining a lock on the database. This ensures that there is only ever one master broker operating concurrently in the network. The system and method therefore allow for a disaster recovery mechanism even when there is no network visibility between the recovery broker at one site and brokers at the other site. This ensures that all transactions are processed on the multi-node system are completed even when one of the computing nodes fails.

In one aspect, a method of retrieving messages at a first computing node is disclosed. The messages are generated at a second computing node. The method involves using a recovery broker at the first computing node. The first computing node and the second computing node share a replicated database system comprised of a first database at the first computing node and a second database at the second computing node. The method includes a step of requesting a lock on a set of database information in the replicated database system. The set of database information is initially generated by a broker in a network of brokers on the second computing node. The method also includes steps of: obtaining the lock on the set of database information when every broker in the network of brokers fails to acquire the lock on the set of database information; retrieving messages from the set of database information; and passing the messages to another broker on the first computing node.

In another aspect, a non-transitory computer-readable medium storing software is disclosed. The software includes instructions executable by one or more computers which, upon such execution, cause the one or more computers to request a lock on a set of database information in a replicated database system. The request is made by a recovery broker in a first computing node and the set of database information is initially generated by a broker in a network of brokers on a second computing node. The instructions are further executable to: obtain the lock on the set of database information when every broker in the network of brokers fails to acquire a new lock on the set of database information; retrieve messages from the set of database information; and pass the messages to another broker on the first computing node.

In another aspect, a message recovery system includes a first computing node and a second computing node. The first computing node includes a first master broker, a first slave broker, a first recovery broker, and a first database. The second computing node includes a second master broker, a second slave broker, a second recovery broker, and a second database. The first database and the second database are constantly synchronized. The first recovery broker competes with the second master broker and the second slave broker for a lock on a set of database information generated by the second computing node.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

While various embodiments are described, the description is intended to be exemplary, rather than limiting and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

A system and method for managing messages in a multi-node system that incorporates an active-active architecture with replicated databases is disclosed. The multi-node system is comprised of two or more computing nodes, where each node further includes a network of brokers and a recovery broker. The recovery broker at each node monitors information on the replicated database to check whether brokers on another computing node are operating normally. If the other computing node fails, the recovery broker automatically takes control of the database information. For any incomplete transactions caused by failure of the other computing node, the recovery broker can retrieve messages associated with those transactions and transfer them to other brokers on its same computing node for further processing.

Control of the database information is based on database locks. The recovery broker therefore checks the replicated database and attempts to acquire a lock on some set of information in the database that is associated with brokers on another computing node. So long as the brokers on the other computing node are functioning properly, the recovery broker is prevented from acquiring a lock on the database for the set of information. However, if the other computing node fails and the brokers on that node are no longer able to process messages and update the database, any locks on the database eventually expire and the recovery broker is able to acquire a new lock. By acquiring the new lock, the recovery broker becomes the master broker temporarily for any messages still in need of processing. The recovery broker can process the messages itself, or it may pass the messages to slave brokers or the master broker operating on its same computing node. This allows any ongoing transactions associated with the failed computing node to be completed.

Figure 1:
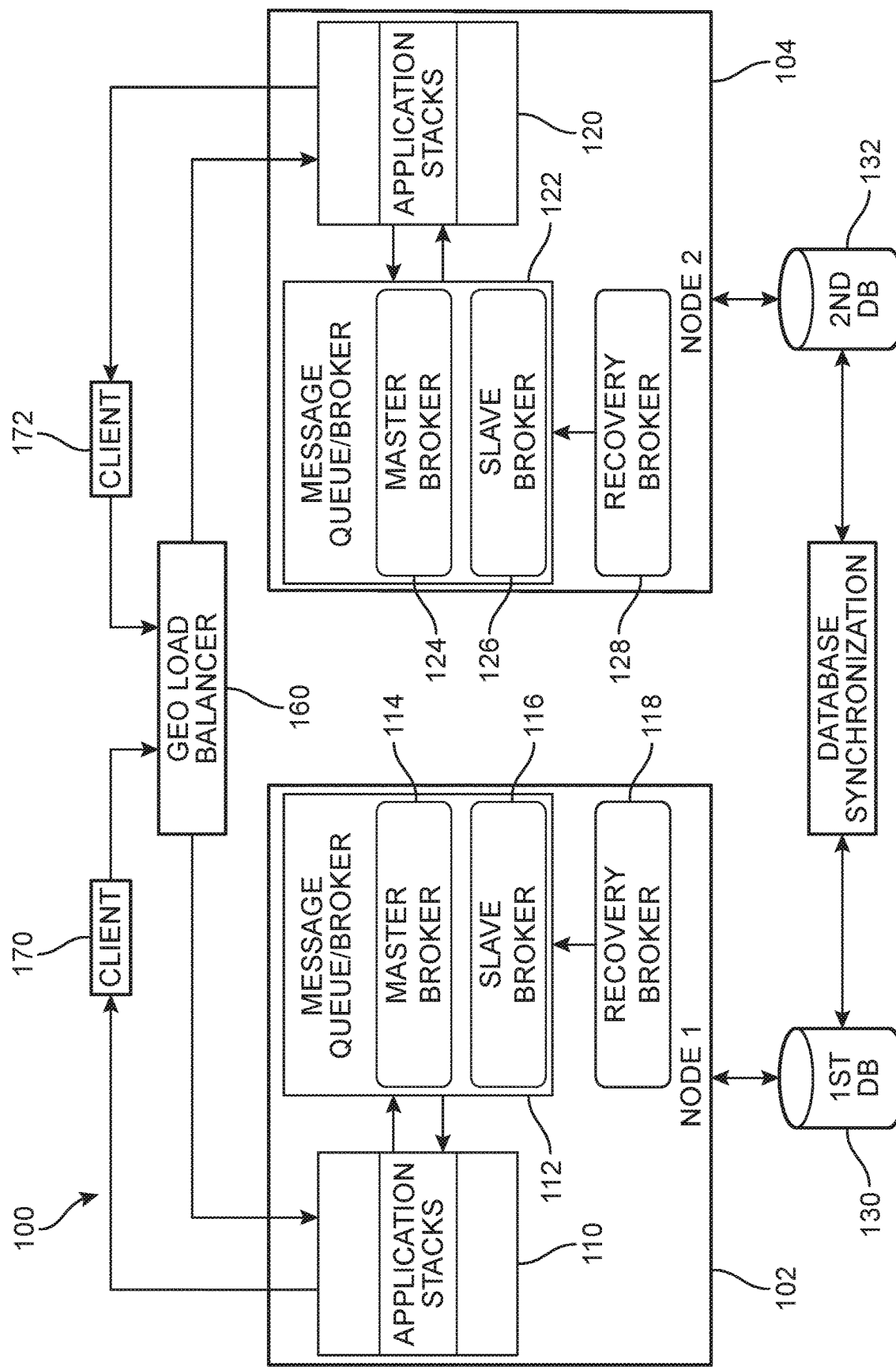
FIG. 1 is a schematic view of a multi-node system, according to an embodiment.

FIG. 1 is a schematic view of an embodiment of a multi-node system 100, or simply system 100. System 100 comprises a plurality of computing nodes that have access to a common replicated database system. These include a first computing node 102 and a second computing node 104. In some cases, first computing node 102 may be associated with a first geographic site, while second computing node 104 may be associated with a second geographic site that is geographically separated from the first geographic site. Thus, system 100 may be characterized as a multi-site system. For purposes of clarity, only two nodes are shown in the exemplary embodiment. However, it may be appreciated that in other embodiments three, four, five, or any other number of nodes suitable for use in an active-active architecture could be used.

As used herein, the term "node" may refer to a combination of hardware and software for processing information as part of an application. A node may include a single computing device, such as a server, or a collection of computing devices, such as a server cluster. In some cases, a node could comprise one or more virtual computing systems, such as a virtual server or a virtual cluster. In some cases, a node could comprise a distinct data center. Thus, each node may have access to at least one processor and some form of memory. Memory may comprise a non-transitory computer readable medium. Instructions stored on the non-transitory computer readable medium may be executed by the one or more processors. Memory may include any type of short-term (volatile) and/or long-term (non-volatile) memory (or storage), including Random Access Memory (RAM), micro-SD memory and Solid State Drives (SSD).

Each node is further comprised of an application stack (or possibly multiple stacks), and a messaging system. The application stack can comprise any number of programs operating in coordination to achieve one or more tasks. For example, a web application may comprise a "web stack". The web stack may include an operating system, a database application, a programming language, and a web server.

A messaging system may comprise a messaging broker that facilitates messaging between different senders and receivers, including different clients and servers. One exemplary messaging system that could be used is the open source message broker Apache Active MQ and/or proprietary implementations of ActiveMQ. Exemplary messaging systems may also implement a high availability network of brokers with so called "master/slave" relationships to provide fault tolerance while ensuring that only one broker can connect with a client.

In the exemplary embodiment, first computing node 102 comprises application stacks 110 and a messaging system 112. Messaging system 112 further comprises a first master broker 114 and a first slave broker 116. For clarity, only one slave broker is shown, however messaging system 112 could be implemented with any suitable number of slave brokers in other embodiments.

Second computing node 104 likewise comprises application stacks 120 and messaging system 122. Messaging system 122 further comprises a second master broker 124 and a second slave broker 126. For clarity, only one slave broker is shown, however messaging system 122 could be implemented with any suitable number of slave brokers in other embodiments.

Each computing node also includes a corresponding recovery broker. For example, first computing node 102 includes a first recovery broker 118 and second computing node 104 includes a second recovery broker 128. The recovery brokers are configured to retrieve and manage messages from a different node in the event that the other node fails. That is, first recovery broker 118 is configured to retrieve and manage messages from second computing node 104 in the event that second computing node 104 fails. Likewise, second recovery broker 128 is configured to retrieve and manage messages from first computing node 102 in the event that first computing node 102 fails. The processes of recovering and managing messages during failure are described in further detail below.

Each computing node has access to a local database. In the embodiment of FIG. 1, first computing node 102 is connected to a first database 130. Second computing node 104 is connected to a second database 132. First database 130 is therefore accessible by applications or modules of first computing node 102. In particular, brokers in messaging system 112 may read and write data to first database 130. Second database 132 is likewise accessible by applications or modules of second computing node 104. In particular, brokers in messaging system 122 may read and write data to second database 132.

The databases of system 100 may connected through a replicated database system. In this embodiment, first database 130 and second database 132 together comprise parts of a replicated database system. That is, first database 130 and second database 132 may be constantly synchronized so that any additions and/or deletions performed on the data at first computing node 102 are reflected in the data stored at second computing node 104. The embodiments could use any database replication solutions known in the art.

System 100 may also make use of a geographic load balancer 160 that distributes incoming requests between different nodes. In the exemplary configuration, requests from a first client 170 and a second client 172 are sent to load balancer 160. Load balancer 160 then sends the requests to either first computing node 102 or second computing node 104 in a manner that balances computational loads across the system. Once served, each node processes requests, with the help of the messaging systems, and responds to the client. For example, a request from first client 170 may sent to first computing node 102, which will then respond directly to first client 170. Likewise, a request from second client 172 may be sent to second computing node 104, which responds directly to second client 172.

Figure 2:
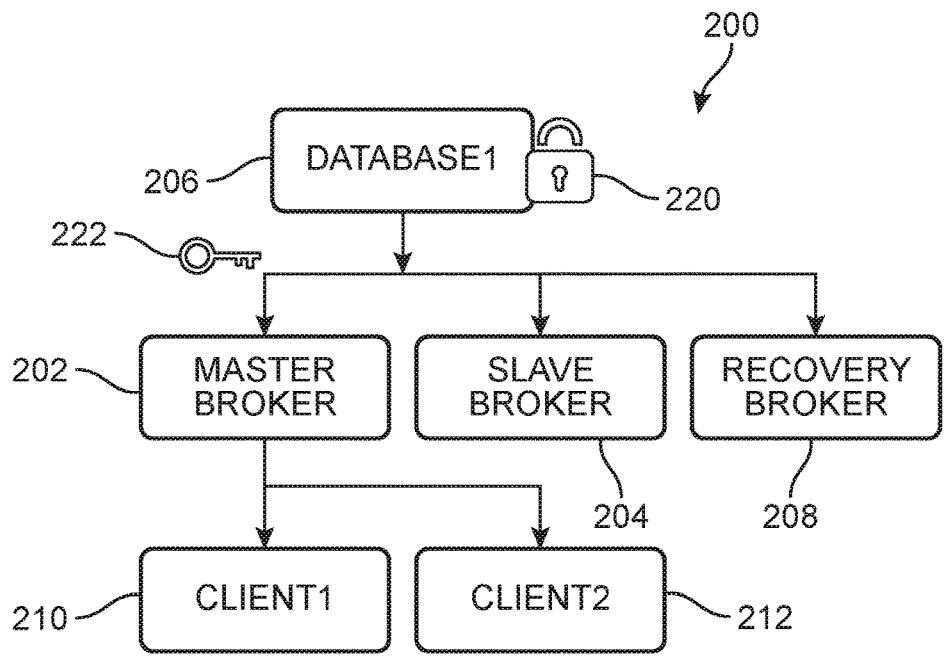
FIG. 2 is a schematic view of relationships between different brokers in a network of brokers, according to an embodiment.

FIG. 2 is a schematic view of a set of relationships 200 between brokers, a database, and clients. In the exemplary configuration, a master broker 202 and a slave broker 204 can read information from a database 206. Messages may be distributed across master broker 202 and slave broker 204, however, master broker 202 may be responsible for communicating with clients (such as first client 210 and second client 212). That is, while a slave may consume all message states from a master, only the master is allowed to start network or transport connectors for communicating with clients.

In this configuration, slave broker 204 may only communicate with clients in the event that slave broker 204 is promoted to a master broker (and, consequently, master broker 202 is demoted to a slave). In this configuration, recovery broker 208 also does not communicate with any clients under normal conditions, since it is also not a master broker under normal operating conditions.

In operation, master broker 202 obtains a lock 220 on a set of information (e.g., a database table) within database 206. With this lock in place, only master broker 202 has permissions (signified schematically by key 222) to write to database 206, thus ensuring the integrity of any stored messages or other information. That is, so long as master broker 202 retains a lock on database 206, slave broker 204 and recovery broker 208 cannot manipulate the database.

Figure 3:
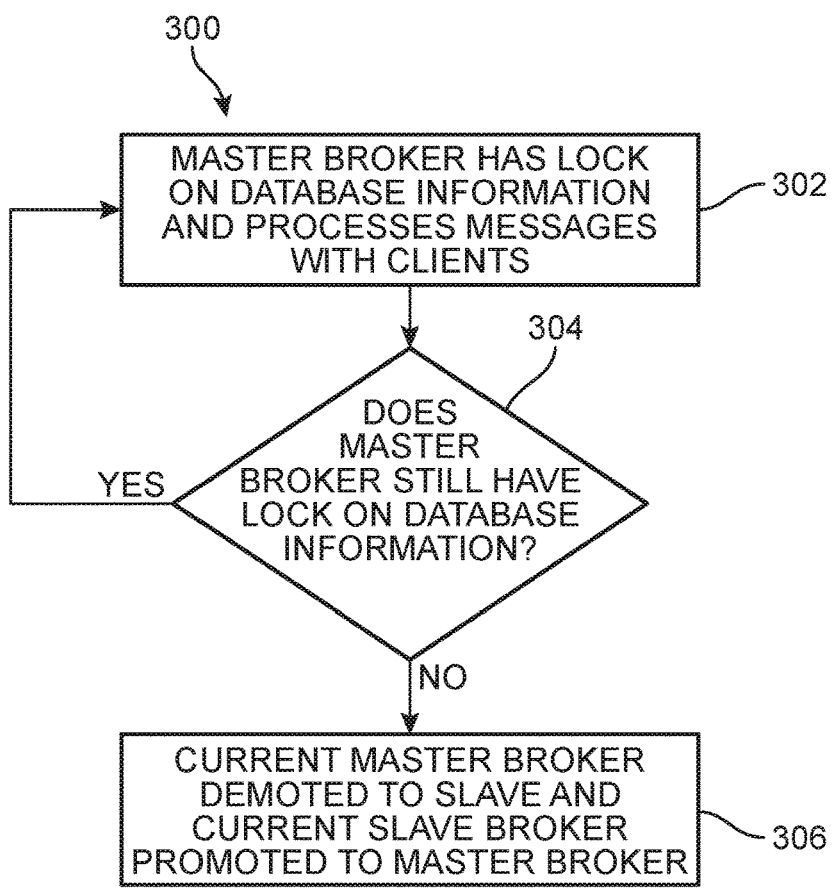
FIG. 3 is a schematic view of a process for electing new master brokers in a network of brokers, according to an embodiment.

FIG. 3 depicts a process 300 for promoting a slave broker to a master broker, in the event that the master broker fails to retain its lock on a database. In particular, this process depicts the normal process of electing a new master broker when multiple brokers on the same network are all active (and thus, no recovery broker is needed). In step 302, the master broker has a lock on database information (e.g., a database table) and processes messages to complete transactions with clients. Next, in step 304, other brokers within the network may check to see if the master still has a lock on the database information. If so, the master continues to retain the lock and process messages. If not, the master is demoted to a slave in step 306, and a current slave broker is promoted to master broker. As part of being promoted to a master broker, the current slave broker obtains a new lock on the database, so that no other brokers can manipulate the set of database information. This process may continue until another slave broker is promoted to master broker, and/or until a recovery broker is promoted to master broker as discussed below.

Figure 4:
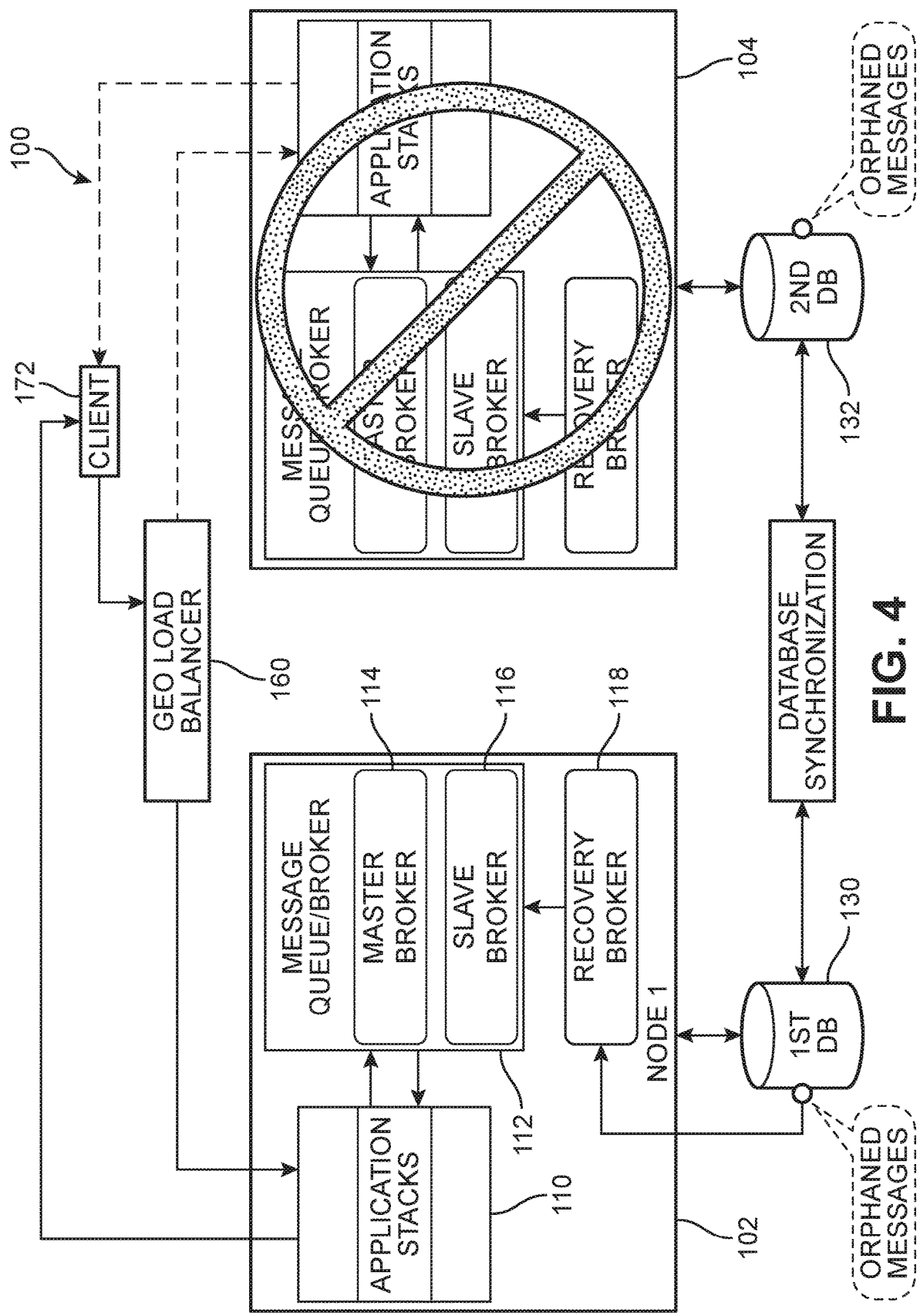
FIG. 4 is a schematic view of the multi-node system of FIG. 1 following the failure of one of the computing nodes.

FIG. 4 illustrates a schematic view of a scenario where second computing node 104 has failed and can no longer communicate with any clients. In this scenario, load balancer 160 may direct incoming requests to first computing node 102. However, first computing node 102 does not have direct access to any messages that were being processed by second computing node 104 immediately before second computing node 104 failed, as there is no broker level visibility on the network between different computing nodes in the present configuration.

The exemplary embodiments provide a method for retrieving orphaned messages (or other information) and processing them to complete any transactions that were ongoing on second computing node 104 at the moment of failure. As seen in FIG. 4, any orphaned messages related to ongoing transactions will be copied from second database 132 to first database 130 during the database synchronization that is ongoing as part of the replicated database architecture of system 100. The information can then be retrieved by first recovery broker 118, using a process described below, and then passed to first master broker 114 and/or first slave broker 116 within messaging system 112. This allows any ongoing transactions to be completed and responses sent back to second client 172.

Figure 5:
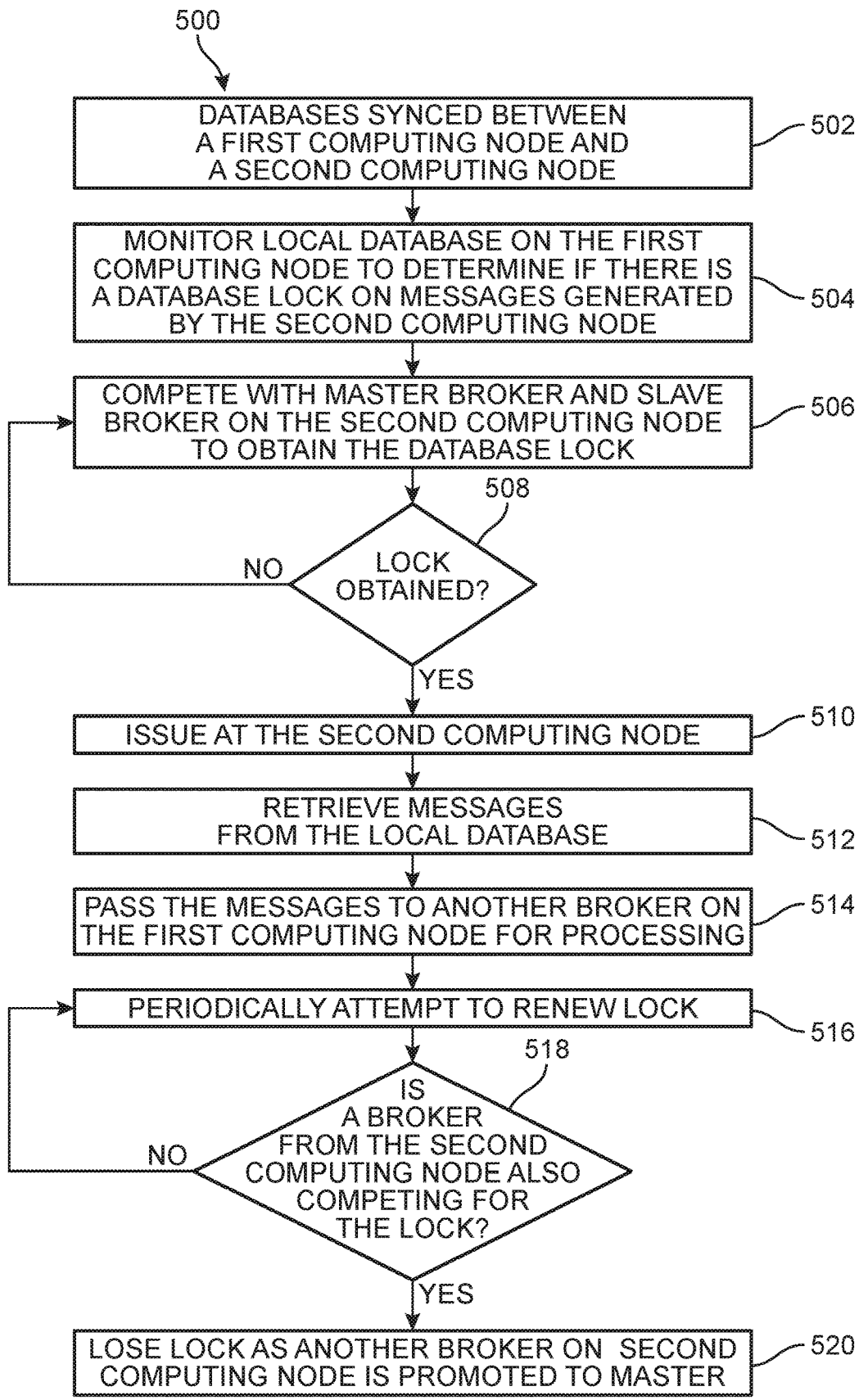
FIG. 5 is a schematic process for using a recovery broker when another computing node in a network fails, according to an embodiment.

FIG. 5 is a schematic view of the process 500 by which a recovery broker may retrieve and help process database information when another node in the system has failed. Referring to FIG. 5, in a first step 502, the local databases at each computing node (for example, first database 130 and second database 132) are synchronized as part of the replicated database architecture. Next, in step 504, a recovery broker (for example, first recovery broker 118) can monitor the local database (e.g., first database 130) on the first computing node to determine if there is a database lock on messages generated by the second computing node.

In step 506, the recovery broker will periodically attempt to acquire a lock on the database. In doing so, the recovery broker will be competing with the master broker and slave broker (for example, second master broker 124 and second slave broker 126) from the second computing node to obtain the database lock. This process may be similar to the process whereby slave brokers compete with a current master broker to become a new master broker.

As described in further detail below, the recovery broker will only be able to obtain a lock on the database in the event that the master broker and one or more slave brokers on the other computing node fail to obtain (or retain) the lock. Moreover, the methods by which each broker attempts to obtain (or retain) a lock on the database can be selected so that the recovery broker is disadvantaged in any scenario where a master broker or a slave broker on the other computing node are available.

Next, in step 508, the recovery broker may check to see if it has obtained a lock on the database. If the recovery broker fails to obtain a lock, the recovery broker returns to step 506 to continue the process of periodically competing with the master broker and slave broker(s) on the second computing node. If the recovery broker does successfully obtain a lock, this indicates that there is an issue at the second computing node at step 510. Next, in step 512, the recovery broker retrieves messages from the local database, including any orphaned messages that were not processed by the second computing node. In step 514, these messages are passed to another broker on the first computing node (that is, to another broker on the recovery broker's own local network).

In step 516, the recovery broker will periodically attempt to renew retain (that is, retain) its lock on the database. Its success in retaining the lock will depend on whether it is competing with any other brokers from the second computing node, as indicated in step 518. If there is no competition (e.g., the second computing node is still down), the recovery broker will retain its lock. As soon as there is competition for the lock, which should occur as soon as the second computing node is up and running, the recovery broker will lose its lock as another broker from the second computing node will acquire the lock and be promoted to master broker, as in step 520.

Embodiments can use different implementations for configuring each broker in a network of brokers so that a recovery broker can only succeed in obtaining a lock when all brokers at the other computing node fail to obtain a lock. More specifically, the network of brokers can be configured so that the recovery broker fails unless brokers on the other computing node are not running or cannot communicate with the database.

Some embodiments can use a database locker solution provided as part of the ActiveMQ messaging system. For example, embodiments can utilize the storage locker mechanisms provided by ActiveMQ, including the Database Locker interface, which locks a database table in a transaction. When using ActiveMQ, the broker that obtains the lock is designated as the master broker in the network of brokers.

Embodiments can also implement the Lease Database Locker interface provided as part of ActiveMQ, which is a specific locker implementation that lets the master broker acquire a lock that's valid only for a fixed duration (i.e., a lease on the lock). After the fixed duration, the lock expires. This interface includes methods that allow the master broker to extend the lock (i.e., extending its lease on the lock) before the lock expires. As the master broker periodically updates its lease, the slave broker checks periodically to see if the lease has expired. If the master fails to renew the lease, the slave will obtain a lock and thereby be promoted to the master broker in the network of brokers.

The Database Locker and Lease Database Locker interfaces are provided with properties, such as a "Lock Keep Alive Period" property and a "Lock Acquire Sleep Interval". The Lock Keep Alive Period property determines the fixed duration (for example, in milliseconds) for which a master broker obtains a lock before it expires. The Lock Acquire Sleep Interval property determines how frequently (for example, in milliseconds) a broker attempts to acquire a lock.

Figure 6:
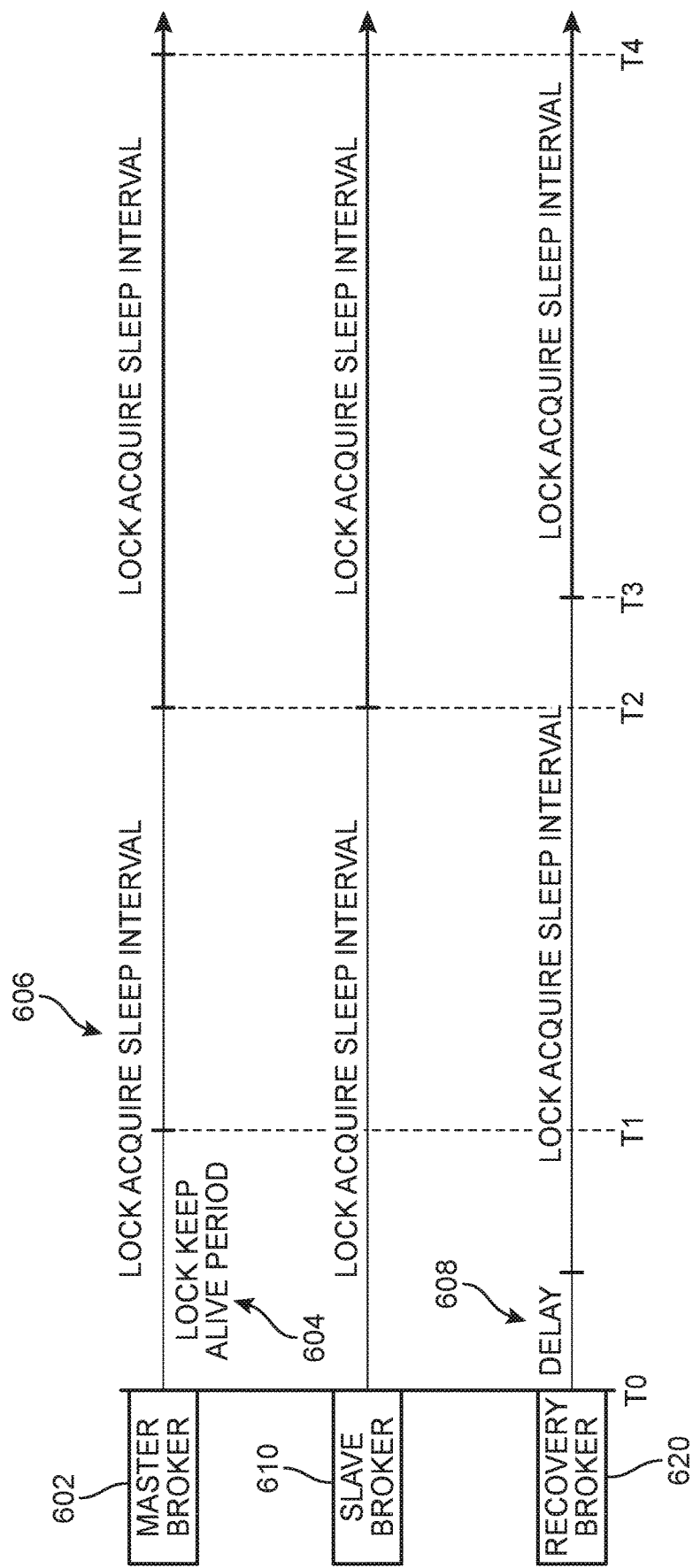
FIG. 6 is a schematic view of some properties for various brokers that may be used as part of a database locker implementation, according to an embodiment.

A timeline of events based on these properties is depicted schematically in FIG. 6. In this example, a master broker 602 obtains the lock at time T0. Initially, the lock is set to expire at a time T2, which occurs after a period defined by the Lock Acquire Sleep Interval 606. However, the master broker 602 will renew its lease on the lock at time T1, which occurs before the lock is set to expire at time T2. In some cases, time T1 may occur after a period defined by Lock Keep Alive Period 604. At this point, the expiration time for the lock is reset to a later time T4. The master broker 602 may then periodically renew its lease on the lock to ensure the lock does not expire so long as the master broker 602 is active. In some cases, this renewal period may be related to the Lock Keep Alive Period 604.

While master broker 602 holds the lock, slave broker 610 will attempt to acquire the lock periodically. In this example, the period corresponds to the Lock Acquire Sleep Interval 606. The first attempt by slave broker 610 to acquire the lock is made at time T2. However, since master broker 602 has already renewed its lease on the lock, and the lock doesn't expire until a later time T4, the slave broker 610 will fail to acquire the lock.

In some embodiments, to ensure that a slave broker cannot acquire a lock before the master broker can renew its lease, the Lock Acquire Sleep Interval 606 should have a value that is greater than the Lock Keep Alive Period 604.

This process will continue, so that before the lock expires at time T4, master broker 602 will extend the lock expiration time again by the Lock Acquire Sleep Interval 606. The next time the slave broker 610 attempts to acquire the lock, it will again fail because the lock has already been extended to a later time. In this scenario, the slave broker 610 will never obtain the lock unless the master broker 602 fails to renew the lock for some reason.

As previously discussed, the recovery broker should be prevented from acquiring a lock as long as any other brokers are active in the network. To achieve this, some embodiments can introduce a delay 608 for recovery broker 620. That is, on startup, recovery broker 620 waits to begin its periodic attempts to acquire a lock by a duration equal to delay 608. After the delay 608, the recovery broker 620 will then make periodic attempts to acquire the lock. In this example, the period corresponds to the Lock Acquire Sleep Interval 606. The recovery broker 620 will make its first attempt at acquiring the lock at time T3. Because time T3 occurs later than time T2, this ensures that slave broker 610 will acquire a lock before recovery broker 620, in the event that master broker 602 fails to renew its lock.

However, if both master broker 602 and slave broker 610 both fail to acquire a lock at any point, which may occur if the other computing node fails, recovery broker 620 will obtain the lock. At this point, recovery broker 620 will retrieve messages and forward the messages to brokers on its own computing node for processing and completing any ongoing transactions that were interrupted when the other computing node failed.

It is desirable for a recovery broker to give up its lock as soon as any brokers on the failed node are back up and running. To achieve this using the ActiveMQ framework, recovery broker 620 may set the Lock Keep Alive Period to 0 upon obtaining a lock. By using a value of 0 for this property, recovery broker 620 will not be able to retain the lock after the next attempt by another broker to acquire the lock. However, the recovery broker will still use a custom Recovery Lease Time property to determine how long its lease on the lock should be extended.

Furthermore, upon successfully reacquiring a lock, a new master broker from the other computing node may synchronize over a period of time defined by the Recovery Lease Time property. This helps ensure that there is never more than one master operating concurrently.

Figure 7:
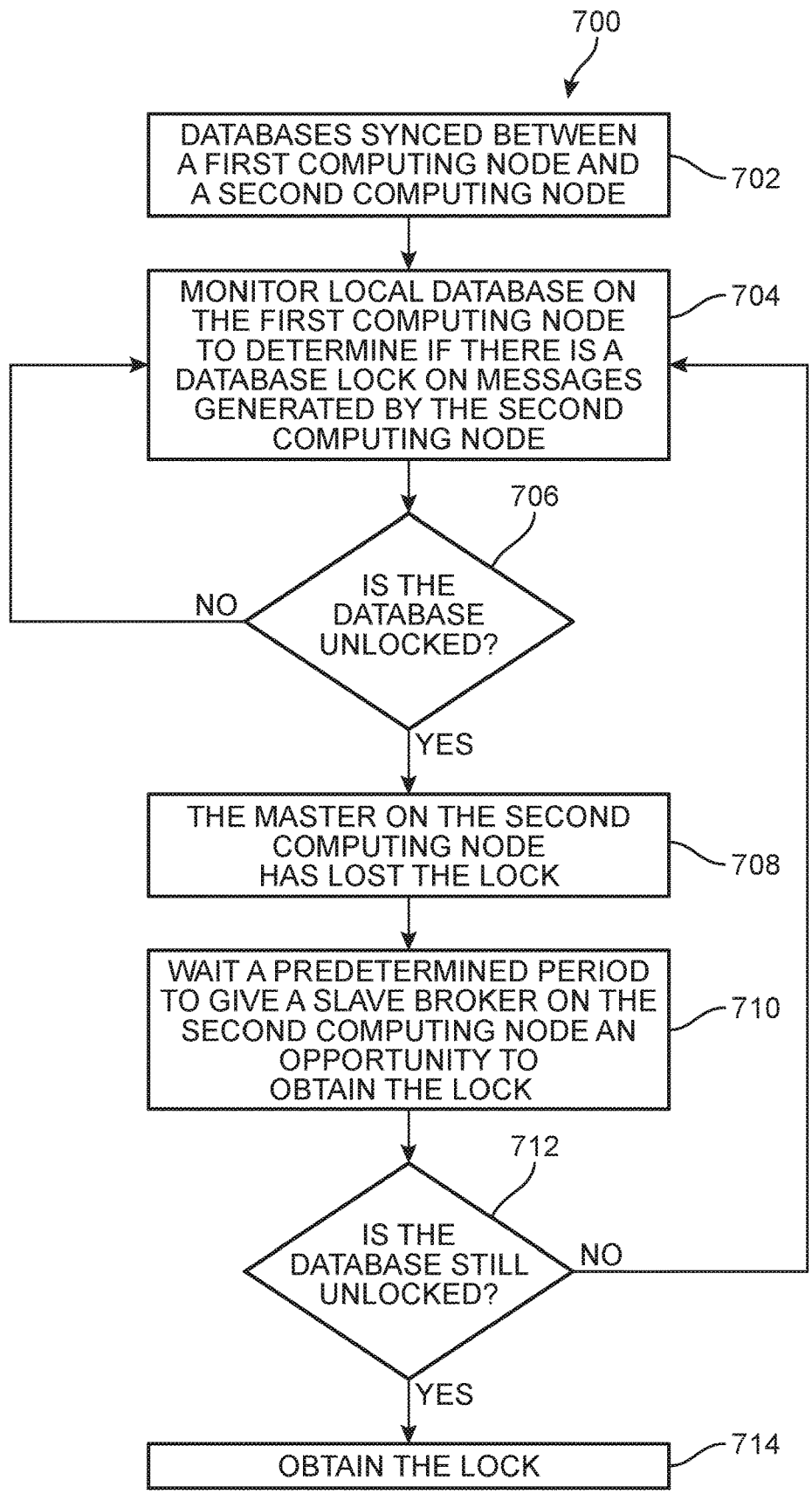
FIG. 7 is a schematic view of a process for controlling a recovery broker, according to an embodiment.

FIG. 7 a schematic view of another process 700 by which a recovery broker may be configured to only obtain a lock when another computing node has failed. In contrast to the embodiment depicted in FIG. 6, in which a delay is used to prevent the recovery broker from "beating" a slave broker on the other node to the lock, the exemplary process requires the recovery broker to check twice before obtaining a lock. This ensures a slave broker on the other node has time to obtain a lock if the master broker on the other node, but not the entire node itself, fails.

Step 702 and step 704 may proceed in a similar manner to step 502 and step 504 of the process described above and depicted in FIG. 5. That is, the databases between a first computing node and second computing node are synchronized and a recovery broker at the first computing node monitors the local (first) database to determine if there is a database lock on messages generated by the second computing node.

In step 706 the recovery broker checks to see if the database is unlocked. If not, the recovery broker returns to step 704 to continue monitoring the database. If the database is unlocked, the recovery broker proceeds to step 708 where it is determined that the master on the second computing node has lost the lock. However, at this point it is unknown if the entire second computing node has failed, or if only the master broker on the second node has failed. To ensure the recovery broker doesn't attempt to obtain the lock in the event that the second computing node is still up and a slave broker on the second computing node is available to take the lock, the exemplary process forces the recovery broker to wait. Specifically, at step 710, the recovery broker waits a predetermined period to give any slave brokers that may be active on the second computing node an opportuning to obtain the lock. The value for the predetermined time may be selected based on the frequency with which the slave brokers attempt to acquire the lock, thereby ensuring the recovery broker waits long enough for a slave broker (should one be available) to make at least one attempt at acquiring the lock.

After waiting the predetermined period, the recovery broker checks again to see if the database is unlocked at step 712. If not, this indicates a slave broker on the second computing node was able to obtain the lock, so that the recovery broker need not take any action. Thus, the recovery broker returns to step 704 to continue monitoring the database.

If the database is still unlocked at step 712, the recovery broker will proceed to step 714 and obtain the lock. At this point the recovery broker will acquire messages from associated with the second computing node. The recovery broker may further relinquish its lock as soon as any brokers on the second computing node are reactivated and available to take the lock, according to the processes discussed above.

Using the exemplary implementations, the embodiments provide a solution that introduces a control on the recovery broker's activation/deactivation. Specifically, this solution ensures that 1) the recovery broker will be the last master to come alive, when master and slave brokers on the cross-site goes down; and 2) the recovery broker is replaced as soon as possible by a master coming alive on the cross-site.

It may be appreciated that the methods described above for recovering messages using the first recovery broker when the second computing node fails can be used by the second recovery broker whenever the first computing node fails. In other words, the architecture is symmetric (for two nodes) and the second recovery broker on the second computing node may be seen to interact with the network of brokers on the first computing node in the same way that the first recovery broker interacts with the network of brokers on the second computing node.

Moreover, the exemplary configuration could be extended to include additional nodes. In some cases, nodes could be paired off, so each node includes one recovery broker responsible for recovering messages from one other node. Alternatively, some embodiments could use multiple recovery brokers per node, where each recovery broker is responsible for recovering messages from another node in the system. In such cases, it may be possible that recovery brokers on different nodes compete with one another using a similar process by which slave brokers in a local network of brokers compete to become the master broker.

While various embodiments have been described above, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of retrieving messages at a first computing node, the messages being generated at a second computing node, using a recovery broker at the first computing node, wherein the first computing node and the second computing node share a replicated database system comprised of a first database at the first computing node and a second database at the second computing node, the method comprising:

requesting a lock on a set of database information in the replicated database system after both a delay defined by a predetermined duration and a recovery broker lock acquire sleep interval during which the recovery broker refrains from requesting the lock, wherein the delay begins on startup and immediately before the recovery broker lock acquire sleep interval and the set of database information is initially generated by a broker in a network of brokers on the second computing node;

obtaining the lock on the set of database information when every broker in the network of brokers fails to acquire the lock on the set of database information;

retrieving messages from the set of database information;

passing the messages to another broker on the first computing node; and wherein the first computing node and the second computing node are configured such that no broker level visibility exists between the first computing node and the second computing node during successful operation of the first computing node and the second computing node.

2. The method according to claim 1, wherein the network of brokers at the second computing node comprises a master broker and a slave broker.

3. The method according to claim 2, wherein the master broker has a keep lock alive period during which the master broker obtains the lock, wherein the slave broker has a slave broker lock acquire sleep interval during which the slave broker refrains from requesting the lock, and the recovery broker lock acquire sleep interval is equal to the slave broker acquire sleep interval in duration.

4. The method according to claim 3, wherein the keep lock alive interval, the slave broker lock acquire sleep interval, and the recovery broker lock acquire sleep interval are sequenced such that the slave broker can only obtain the lock if the master broker fails to renew the lock and the recovery broker can only obtain the lock if both the master broker and slave broker fail to renew the lock.

5. The method according to claim 3, wherein the method further comprises making an initial request for the lock after the master broker at the second computing node has renewed its lease on the current lock.

6. The method according to claim 1, wherein the messages are associated with an ongoing transaction with a client, and wherein upon receiving the messages a master broker on the first computing node processes the messages to complete the ongoing transaction with the client.

7. The method according to claim 1, wherein requests from clients are distributed to the first computing node and the second computing node using a load balancer.

8. The method according to claim 1, wherein the recovery broker and the network of brokers at the second computing node are implemented using ActiveMQ.

9. A non-transitory computer-readable medium storing software comprising instructions executable by one or more computers which, upon such execution, cause the one or more computers to:
 request a lock on a set of database information in a replicated database system, wherein the request is made by a recovery broker in a first computing node after both a delay defined by a predetermined duration and a recovery broker lock acquire sleep interval during which the recovery broker refrains from requesting the lock, wherein the delay begins on startup and immediately before the recovery broker lock acquire sleep interval, wherein the set of database information is initially generated by a broker in a network of brokers on a second computing node, and wherein the first computing node and the second computing node are configured such that no broker level visibility exists between the first computing node and the second computing node during successful operation of the first computing node and the second computing node;
 obtain, by the recovery broker, the lock on the set of database information when every broker in the network of brokers fails to acquire a new lock on the set of database information;
 retrieve, by the recovery broker, messages from the set of database information; and
 pass, by the recovery broker, the messages to another broker on the first computing node.

10. The non-transitory computer-readable medium according to claim 9, wherein the replicated database system further comprises a first database associated with the first computing node and a second database associated with the second computing node and wherein the request made by the recovery broker occurs after a delay defined by a predetermined duration.

11. The non-transitory computer readable medium according to claim 9, wherein the network of brokers at the second computing node comprises a master broker and a slave broker.

12. A message recovery system, comprising:
 a first computing node comprising:
  a first master broker;
  a first slave broker;
  a first recovery broker; and
  a first database;
 a second computing node comprising:
  a second master broker;
  a second slave broker;
  a second recovery broker; and
  a second database;
 wherein the first database and the second database are periodically synchronized;
 wherein the first recovery broker competes with the second master broker and the second slave broker for a lock on a set of database information generated by the second computing node;
 wherein the first computing node and the second computing node are configured such that no broker level visibility exists between the first computing node and the second computing node during successful operation of the first computing node and the second computing node; and
 wherein the first recovery broker requests the lock after both a delay defined by a predetermined duration and a recovery broker lock acquire sleep interval during which the recovery broker refrains from requesting the lock and wherein the delay begins on startup and occurs immediately before the recovery broker lock acquire sleep interval.

13. The message recovery system according to claim 12, wherein the message recovery system further comprises a load balancer that distributes requests from clients to the first computing node or the second computing node.

14. The message recovery system according to claim 12, wherein the first database and the second database are part of a replicated database system.

15. The message recovery system according to claim 12, wherein the master broker has a keep lock alive period during which the master broker obtains the lock, wherein the slave broker has a slave broker lock acquire sleep interval during which the slave broker refrains from requesting the lock, and the recovery broker lock acquire sleep interval is equal to the slave broker acquire sleep interval in duration.

16. The message recovery system according to claim 15, wherein the keep lock alive interval, the slave broker lock acquire sleep interval, and the recovery broker lock acquire sleep interval are sequenced such that the slave broker can only obtain the lock if the master broker fails to renew the lock and the recovery broker can only obtain the lock if both the master broker and slave broker fail to renew the lock.

17. The message recovery system according to claim 12, wherein upon obtaining the lock, the first recovery broker retrieves messages from the set of database information and passes the messages to the first master broker or the first slave broker for further processing so that any ongoing transactions started at the second computing node can be completed.

18. The message recovery system according to claim 12, wherein the second recovery broker competes with the first master broker and the first slave broker for a second lock on a second set of database information generated by the first computing node.

19. The message recovery system according to claim 18, wherein the second recovery broker obtains the lock on the second set of database information whenever the first master broker and the first slave broker fail to acquire the second lock.

20. The message recovery system according to claim 18, wherein upon obtaining the second lock, the second recovery broker loses the second lock when any broker from the first computing node attempts.

* * * * *